United States Patent
Hua et al.

(10) Patent No.: US 12,375,820 B2
(45) Date of Patent: Jul. 29, 2025

(54) NOISE ESTIMATION USING USER-CONFIGURABLE INFORMATION

(71) Applicant: TEXAS INSTRUMENTS INCORPORATED, Dallas, TX (US)

(72) Inventors: Gang Hua, Katy, TX (US); Mihir Narendra Mody, Bangalore (IN); Rajasekhar Reddy Allu, Plano, TX (US); Niraj Nandan, Plano, TX (US); Shashank Dabral, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 135 days.

(21) Appl. No.: 17/739,291

(22) Filed: May 9, 2022

(65) Prior Publication Data

US 2022/0263979 A1    Aug. 18, 2022

Related U.S. Application Data (63) Continuation of application No. 16/442,137, filed on Jun. 14, 2019, now Pat. No. 11,330,153.

(51) Int. Cl.
  *H04N 23/81*   (2023.01)
  *H04N 23/84*   (2023.01)
  *H04N 25/61*   (2023.01)

(52) U.S. Cl.
  CPC ............ *H04N 23/81* (2023.01); *H04N 23/84* (2023.01); *H04N 25/61* (2023.01); *G06T 2207/20064* (2013.01)

(58) Field of Classification Search
  None
  See application file for complete search history.

(56) References Cited

U.S. PATENT DOCUMENTS

| | | | |
|---|---|---|---|
| 8,532,373 | B2 | 9/2013 | Hong |
| 2004/0234166 | A1 | 11/2004 | Nakajima et al. |
| 2005/0206966 | A1* | 9/2005 | Kakumitsu ............ H04N 25/61 |
| | | | 348/E5.079 |
| 2009/0092337 | A1 | 4/2009 | Nagumo |
| 2010/0091127 | A1 | 4/2010 | Hampton et al. |
| 2012/0093433 | A1 | 4/2012 | Gupta et al. |
| 2012/0182451 | A1* | 7/2012 | Prabhudesai ............ G06T 5/20 |
| | | | 348/241 |
| 2012/0206582 | A1 | 8/2012 | DiCarlo et al. |

(Continued)

OTHER PUBLICATIONS

International Search Report for PCT/US2020/037685 mailed Sep. 3, 2020.

*Primary Examiner* — Twyler L Haskins
*Assistant Examiner* — Wesley J Chiu
(74) *Attorney, Agent, or Firm* — Michael T. Gabrik; Frank D. Cimino (57) ABSTRACT

In some examples, a method comprises receiving pixel data from an image capture device having a color filter, wherein the pixel data represents a portion of an image. The method further includes performing wavelet decomposition on the pixel data to produce decomposed pixel data and determining a local intensity of the pixel data. The method also includes determining a noise threshold value based on the local intensity and a noise intensity function that is based on the color filter; determining a noise value for the pixel data based on the decomposed pixel data and the noise threshold value; and correcting the pixel data based on the noise value to produce an output image.

18 Claims, 7 Drawing Sheets

(56) References Cited

U.S. PATENT DOCUMENTS

| | | | |
|---|---|---|---|
| 2013/0114895 A1* | 5/2013 | Hong | G06T 5/10 |
| | | | 382/167 |
| 2014/0375493 A1 | 12/2014 | Weisenburger et al. | |
| 2016/0343115 A1* | 11/2016 | Kusumi | G06T 5/70 |
| 2017/0178309 A1 | 6/2017 | Rakhshanfar et al. | |
| 2017/0223267 A1* | 8/2017 | Dabral | G06T 5/94 |
| 2017/0318240 A1 | 11/2017 | Yu | |

\* cited by examiner

NOISE ESTIMATION USING USER-CONFIGURABLE INFORMATION

CROSS-REFERENCE TO RELATED APPLICATIONS

This application is a continuation of U.S. patent application Ser. No. 16/442,137, filed Jun. 14, 2019, which is incorporated by reference herein in its entirety.

SUMMARY

In accordance with some examples, a method comprises receiving pixel data from an image capture device having a color filter, wherein the pixel data represents a portion of an image. The method further includes performing wavelet decomposition on the pixel data to produce decomposed pixel data and determining a local intensity of the pixel data. The method also includes determining a noise threshold value based on the local intensity and a noise intensity function that is based on the color filter; determining a noise value for the pixel data based on the decomposed pixel data and the noise threshold value; and correcting the pixel data based on the noise value to produce an output image.

In accordance with some examples, a system comprises an image capture device configured to capture raw pixel data of multiple images of a scene, and an image processor coupled to the image capture device. The image processor comprises noise filter logic configured to generate a signal to noise ratio value using a fixed-bit size raw pixel data and a user-defined noise-intensity function, where the fixed-bit size raw pixel data comprises merged raw pixel data of the multiple images. The noise filter logic comprises suppression logic that is configured to estimate noise in the multiple images using the signal to noise ratio value.

In accordance with some examples, an image processing system comprises an image capture device configured to capture multiple images of raw pixel data of a scene; and an image processor coupled to the image capture device. The image processor comprises first averaging logic configured to generate correlated local intensity of the multiple images based on a user-programmed correlation information of a color filter array employed in the image capture device; noise calculation logic configured to generate a noise threshold value based on the correlated local intensity and a user-defined first approximation logic; and sub-band suppression logic configured to estimate noise in the multiple images using the noise threshold value.

BRIEF DESCRIPTION OF THE DRAWINGS

For a detailed description of various examples, reference will now be made to the accompanying drawings in which.

DETAILED DESCRIPTION

An image capture device (e.g., a camera) includes multiple image sensors (e.g., complementary metal-oxide-semiconductor (CMOS) image sensors). When an image of a scene is photographed, the multiple image sensors—sometimes also referred to as "pixel sensors"—detect and convey raw information about the scene to a processing system (e.g., digital signal processing system), which further processes the raw information to create a digital image. Each of the pixel sensors includes—amongst other system elements (e.g., an amplifier transistor, reset transistor)—a photodetector to detect the intensity of light of the scene. However, the photodetectors, by themselves, are unable to detect the wavelength of the detected light and, thus, are unable to determine color information. Consequently, the pixel sensors may further include a filter that may overlay or be disposed over the pixel sensors to capture color information. An array of color filters, referred to herein as a color filter array (CFA), is disposed on the image capture device. In some cases, the CFA may include an array of 2×2 color filters, where each such CFA includes four color filters arranged in a 2×2 matrix. Each of the color filters of the CFA is disposed on one pixel sensor and is configured to filter the captured light by wavelength. Thus, when the color filter array and the pixel sensor are used in conjunction, they may provide both wavelength and intensity information about light captured/detected through the image capture device, which may be representative of a captured image.

One commonly employed CFA is the Bayer CFA, which has a 2×2 filter pattern that is 50% green, 25% red and 25% blue. Thus, an image capture device utilizing a Bayer CFA may provide information regarding the intensity of the light received at the green, red, and blue wavelengths, where each pixel sensor captures only one of the three colors (red, green, or blue). The information captured by each pixel sensor may be referred to as raw pixel data, and is processed by the processing systems to generate the digital image. In some cases, the raw pixel data includes binary digits (e.g., 0, 1) and has finite bit size (e.g., 12 bits).

Currently used processing systems (or image processing systems) are equipped to process data received from image capture devices, including Bayer CFA. However, modern image capture devices may use an arbitrary 2×2 filter pattern including any of red, blue, green, clear, and infrared filters. The conventional processing systems do not process raw pixel data received from image capture devices that include arbitrary 2×2 filter patterns.

The image processing systems generally use various techniques to process raw pixel data received from each of the pixel sensors. One such technique is high dynamic range (HDR) imaging (or wide dynamic range (WDR) imaging), in which the processing system receives multiple images or frames of the same scene. Each of the multiple images has a different characteristic (e.g., exposure times, apertures, shutter speed and/or sensitivity). The HDR/WDR imaging technique involves merging the raw pixel data of the multiple images to generate a single merged image. Some currently used processing systems that implement the HDR/WDR imaging technique process the multiple images separately and then merge them to form a single merged image. Such processing systems require three separate processing blocks or logic, thus requiring more silicon area, and therefore are not cost effective. Alternatively, some processing systems that implement the HDR/WDR imaging technique process the multiple images serially and then merge them. However, such processing systems are less efficient, have low performance, and may need more processing time. Therefore, an image processing system is desired to mitigate the problems with the currently used processing systems mentioned above.

Accordingly, at least some of the examples disclosed herein are directed to systems and methods for processing (e.g., filtering) raw pixel data received from an image capture device, including pixel sensors employing arbitrary color filter arrays (or formats). At least some of the examples disclosed herein are related to an image processing system implementing an example pipeline design—which is sometimes, in this disclosure, referred to as a high bit-width (HBW) pipeline.

In some examples, the HBW pipeline includes a front-end processing logic, which is configured to receive raw pixel data of multiple images and to merge the images to generate a merged image including pixel data having a fixed bit size. The HBW pipeline employs a single processing block for merging the multiple streams of raw pixel data, thereby mitigating the area/cost problem mentioned above. The pixel data with a fixed bit size is sometimes referred to herein as fixed bit size (FBS) pixel data. In this disclosure, the terms block and logic are interchangeably used. A logic or a block can include hardware components (e.g., filters) or software components (e.g., a processor implementing machine executable instructions), or can be a combination of both hardware and software components.

In some examples, the HBW pipeline further includes an HBW threshold computation logic that is configured to process (e.g., filter) the FBS pixel data. Furthermore, in at least some examples, the HBW threshold computation logic is configured to estimate local signal and intensity data of the raw pixel data. Local signal and intensity data are two local features of the image being captured. Local signal data is a measure of the decomposed bands of the FBS pixel data. The decomposed bands may be filtered using a high-pass filter to calculate the local signal. Local intensity data is the average local intensity of the pixels. As described below in detail, the local signal and intensity data estimation enable the image processing system to receive raw pixel data from an image capture device implementing any one of the arbitrary CFAs.

In addition, in some examples, the HBW threshold computation logic is configured to support lens shading correction compensation. This feature may be useful as the image data received by the front-end processing logic may be lens shading corrected before it is filtered by the HBW threshold computation logic.

Figure 1:
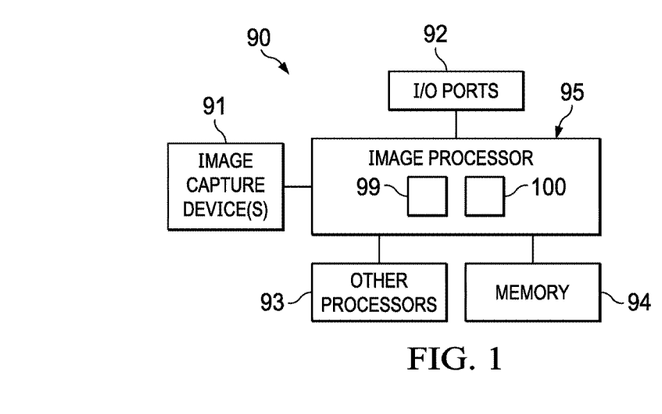
FIG. 1 depicts a block diagram of an illustrative image processing system, in accordance with various examples.

FIG. 1 depicts an illustrative image processing system 90 configured to implement the HDR/WDR imaging technique. As described in greater detail below, the image processing system 90 is equipped to handle raw pixel data received from an image capture device using any of the arbitrary CFA (e.g., 2×2 filter patterns).

In some examples, the image processing system 90 (hereinafter "IPS 90") includes an image processor 95, input/output (I/O) ports 92, image capture device(s) 91, other processors 93, and memory 94. The IPS 90 is configured to apply various image processing operations of a HBW pipeline 100 (described ahead in FIG. 2) to the raw pixel data acquired by the image capture device 91 to render a processed image that may be used by other processing elements of the system or viewed by a user on a display (a display unit is not expressly depicted in FIG. 1). The raw pixel data processed by the IPS 90 may also include raw pixel data retrieved from the memory 94.

Figure 2:
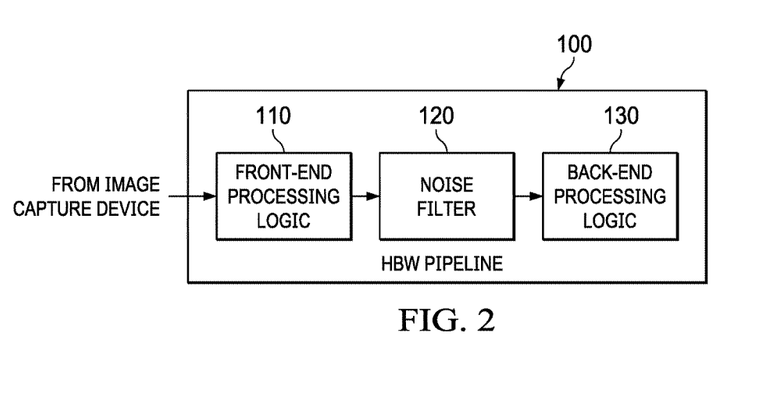
FIG. 2 depicts a simplified diagram of an illustrative high-bit width (HBW) pipeline of the image processing system, in accordance with various examples.

In some examples, the image processor 95 includes one or more special-purpose microprocessors and/or application specific microprocessors, or a combination of such processing units. In some examples, the memory 94 (e.g., random access memory (RAM), read only memory (ROM)) may include any suitable type of non-transitory computer-readable medium storing machine-executable instructions for implementing HBW pipeline 100 (FIG. 2). The machine-executable instructions, when executed by the image processor 95, cause the image processor 95 to perform one or more of the actions attributed herein to the HBW pipeline 100. In some examples, some attributes of the actions performed by the HBW pipeline 100 may be user-configurable. For example, a user may store information in the form of a look-up table, which is accessed by the image processor 95 while implementing aspects of the HBW pipeline 100.

In other examples, the image processor 95 includes dedicated hardware components, e.g., filters, logic gates that implement the HBW pipeline 100. In such examples, the look-up tables are stored in a pipeline register interface 99, which is accessed by the pipeline hardware. Examples of such hardware implementation are described ahead.

In some examples, the image processor 95 may include one or more processor that uses an instruction set (e.g., reduced instruction set computer (RISC)) processors, as well as graphics processors (GPUs) or digital signal processors (DSPs), and may also include other dedicated image and/or video processors. In some examples, the processing of the raw pixel data may primarily be handled by the image processor 95, thus effectively offloading such tasks from other processors 93, which may include a central processing unit (CPU), or one or more microprocessors.

In some examples, the image capture device 91 may include a digital camera that can acquire both still images and moving images (e.g., video). The image capture device 91 includes multiple pixel sensors (e.g., CMOS pixel sensors). In some examples, the pixel sensor may include on-board image signal processing logic (not expressly shown in FIG. 1) that is separate from the image processor 95 of the IPS 90.

In one example, the IPS 90 is implemented in a system-on-chip (SoC) device that may be used in Advanced Driver Assistance Systems (ADAS) (and related applications) including camera-based front (mono/stereo), rear, surround view and night vision systems. These camera systems assist the driver, for example, in parking the vehicle safely by providing a 360 degree bird's eye view of the vehicle. ADAS, in some examples, employs 4 to 6 wide angled cameras. The views provided by ADAS enhance the visibility of the driver while parking and maneuvering in different situations.

Now referring to FIG. 2, a simplified diagram of an illustrative HBW pipeline 100 is shown. FIG. 2 is intended to provide a general overview of the HBW pipeline 100 and a general description of how the functional components of the HBW pipeline 100 process the raw pixel data captured by each pixel sensor. A more specific description of certain operations is provided in detail below.

For the sake of illustration and simplicity, assume for the description ahead that the image capture device includes an N×K array of pixel sensors, and, as noted above, each of these pixel sensors captures raw pixel data. The digital image captured by the N×K array of pixel sensors can be represented by a similar N×K matrix having the same number of digital pixels as the pixel sensors in the image capture device. The digital image may also be represented by a matrix function: raw_pixel_data (n, k), where the matrix function raw_pixel_data (n, k) denotes the raw pixel data captured by the pixel sensor present in the $n^{th}$ row and $k^{th}$ column.

In some examples, the HBW pipeline 100 includes a front-end processing logic 110, a noise filter logic 120, and a back-end processing logic 130. In some examples, the front-end processing logic 110 is configured to receive the raw pixel data captured by each of the pixel sensors of the image capture device 91 (FIG. 1). In some examples, the image capture device 91 communicates the raw pixel data using a sensor interface (not expressly shown in either FIG. 1 or FIG. 2). For example, the sensor interface may utilize a Standard Imaging Architecture (SIA) interface or any other suitable serial or parallel image sensor interface, or a combination of such interfaces.

As noted above, HDR/WDR imaging includes processing multiple images of a single scene captured by the image capture device 91. To save costs and improve efficiency, the front-end processing logic 110 is configured to merge the raw pixel data of multiple images before the data is sent for further processing. To that effect, the front-end processing logic 110 is configured to: receive raw pixel data of multiple images; perform a merge algorithm on these multiple images; and generate a single image including the merged raw pixel data. The merge algorithm is performed such that the raw pixel data of the multiple images having the same row and column values are merged to generate a merged pixel data of a merged image including N×K merged pixels. For example, the raw pixel data of the multiple images in the $5^{th}$ row and $7^{th}$ column are merged to generate a merged pixel data at the $5^{th}$ row and $7^{th}$ column of a merged image.

In some examples, each of the merged pixels is further tone-mapped and converted into a merged pixel having a fixed bit size. The function of the front-end processing logic (e.g., the operation of the merge algorithm and the generation of the FBS pixel data) may be implemented in accordance with techniques disclosed in U.S. patent application Ser. No. 15/183,495, titled "Image Processing for Wide Dynamic Range (WDR) Sensor Data," which was filed on Jun. 15, 2016, and assigned to the assignee of the present disclosure, the entirety of which is incorporated herein by reference.

The HBW pipeline 100 further includes the noise filter logic 120 that is configured to process the FBS pixel data by implementing an HBW computation logic, which may include one or more computation blocks and is described below in FIGS. 3 and 4. The noise filter logic 120 processes the incoming FBS pixel data and calculates a noise threshold and a signal to noise ratio. The noise filter logic 120, at least in part, suppresses noise from the incoming FBS pixel data. The HBW computation logic, described in detail below, first decomposes the incoming FBS WDR pixel data, then compares the decomposed signal to a threshold value, and then discards some portion of signal based on the comparison.

Figure 9:
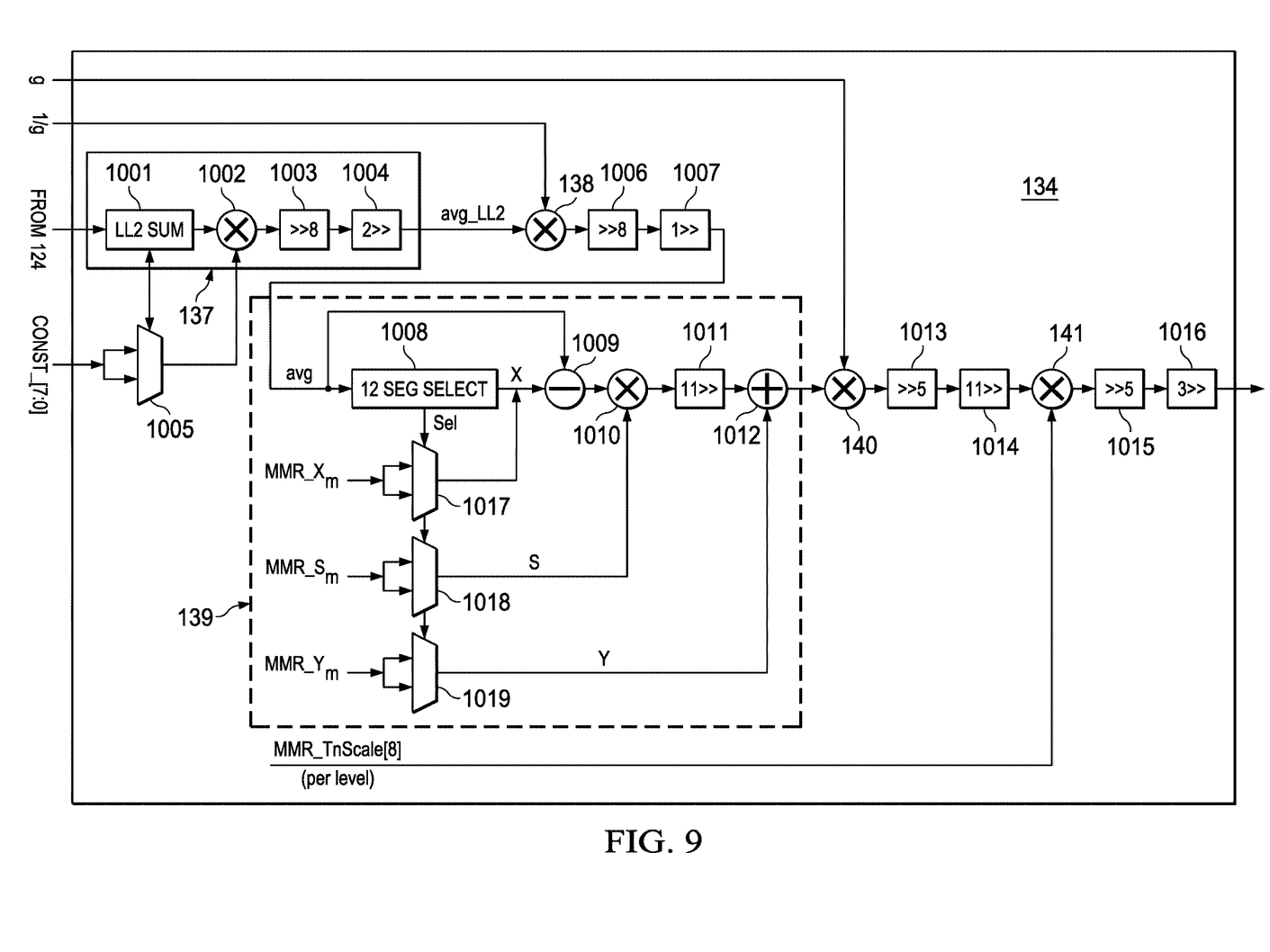
FIG. 9 depicts an illustrative hardware implementation of a threshold calculation logic present in the threshold logic of FIG. 4, in accordance with various examples.

In some examples, some features of the HBW computation logic may be user configurable in that a user may provide some characteristics of the image capture device 91 to the IPS 90. For example, the user may provide correlation information about the CFA used in the image capture device 91. The correlation information indicates the degree of similarity between the outputs of each of the filters in a CFA. For example, if a CFA with an R, G, G, C pattern is employed, the user may store 1, 1, 1, 0 in a memory location. In this example, the first bit value 1 corresponds to a red filter, the second bit value 1 corresponds to a green filter, the third bit value 1 corresponds to another green filter, and the fourth bit value 0 corresponds to a clear filter. The bit values 1 indicate that the information received from each of these filters is correlated, whereas the information received from the clear filter is not correlated to the others. This user programmability enables the IPS 90 to process data received from image capture device 91 using any one of the arbitrary 2×2 CFAs. Furthermore, this user programmability improves the overall resolution of the reconstructed image. For example, the user-programmed correlation information enables the calculation of local signal and intensity data, which improves the resolution of the output image. In some examples, the HBW computation logic is also configured to support lens shading correction compensation, which may be used as the FBS pixel data—which is derived from the merged WDR pixel data—may be lens shading corrected before it is filtered by the HBW threshold logic. As further described in detail below in FIG. 9(a), the lens shading correction compensation function of the HBW computation logic may also be user-configurable. For example, the user may program a lens shading correction gain function into the IPS 90.

Still referring to FIG. 2, the output of the noise filter logic 120 (the reconstructed image) is sent to the back-end processing logic 130. The back-end processing logic 130 may apply one or more additional post-processing operations to the reconstructed data. In some examples, the back-end processing logic 130 may provide for dynamic range compression of image data using local tone mapping operators, brightness, contrast and color adjustments, color extraction, format conversion as well as scaling logic for scaling the image data to one or more desired resolutions. In other examples, the back-end processing logic 130 may perform other related functions.

Figure 3:
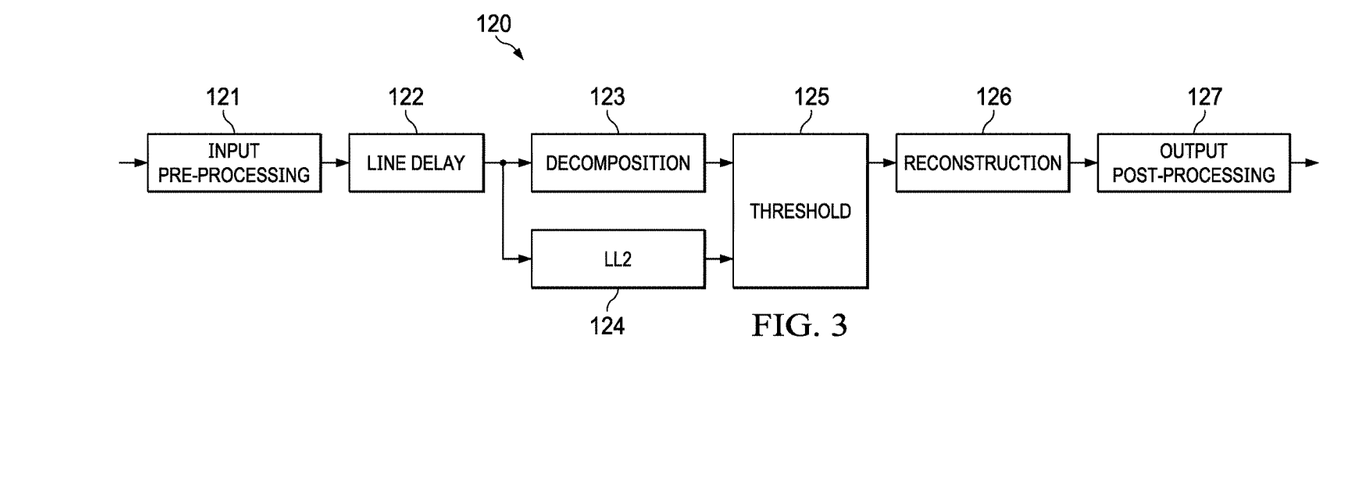
FIG. 3 depicts a simplified diagram of a noise filter logic of the HBW pipeline, in accordance with various examples.

Referring now to FIG. 3, an illustrative simplified pipeline design of the noise filter logic 120 is shown. The pipeline design of the noise filter logic 120 is configured to implement the HBW computation logic mention above. In one example, the noise filter logic 120 includes a decomposition logic 123, a threshold logic 125, and a reconstruction logic 126. In some examples, in addition to the logic mentioned above, the noise filter logic 120 also includes an input pre-processing logic 121, a line delay logic 122, a low pass filter logic (LL2 logic) 124, and an output post processing logic 127.

The pipeline design of the noise filter logic 120 is now described in greater detail. The input pre-processing logic 121 transforms the incoming FBS pixel data to a format that is compatible with subsequent steps. For example, the input pre-processing logic 121 may concatenate all the FBS pixel data placed in certain positions (e.g., alternating rows) into concatenated FBS pixel data, and then synchronize the concatenated FBS pixel data. In some examples, the pre-processed FBS pixel data may then be provided as an input to the line delay logic 122, which, in some examples, acts as a line buffer. In some examples, the memory 94 of FIG. 1, e.g., random access memory (RAM), is used to temporarily store the pre-processed FBS pixel data. In other examples, the line delay logic 122 may include a dedicated memory buffer to store the incoming pre-processed FBS pixel data. In some examples, the line delay logic 122 stores the pre-processed FBS pixel data that derives from a portion (e.g., 16 rows×16 columns) of an N×K merged image.

The pre-processed FBS pixel data then moves to the decomposition logic 123, which performs a decomposition function on the pre-processed FBS pixel data. The decomposition function, in some examples, includes redundant space-frequency decomposition, e.g., redundant wavelet decomposition. Wavelet decomposition is now briefly described. Wavelet decomposition is a linear transformation process that allows for time localization of different frequency components of a given one dimensional signal. In the case of two-dimensional signals, wavelet transformation allows for space and frequency localizations. The wavelet transformation employs a wavelet prototype function, also referred to as a "mother wavelet," which provides a localized signal processing method to decompose the given signal, or another form (e.g., differential signal) of the given signal, into a series (or bands) of wavelet components.

For the sake of illustration, assume that decomposition logic 123 performs a decomposition function on the pre-processed FBS pixel data that derives from a portion (e.g., 6 rows×6 columns) of the N×K merged image. After decomposition, the output of decomposition logic 123 includes J bands for each filter color (e.g., each color of the 2×2 CFA), meaning that the output of decomposition logic 123 may have J (which is an integer) number of bands for each of the 4 color filters used in the CFA. The output of decomposition logic 123 can be denoted as DECOMP [J] [4]. From a hardware implementation standpoint, the decomposition logic 123 may be implemented by a series of low pass, mid pass, and high pass filters arranged in a manner to decompose the pre-processed FBS pixel data. The low, mid, and high pass filters couple to each other such that the combined system of filters performs the decomposition function of the decomposition logic 123 and generates J decomposed bands for each color plane. In other examples, the filters may not be a separate hardware unit and the function of each of the filters is performed by the image processor 95 by implementing machine executable instructions.

The output of the line delay logic 122 may also be received by the LL2 logic 124, which also performs a filtering function. The LL2 logic is shown as a separate logic in FIG. 3. However, in some examples, the LL2 logic 124 is part of the decomposition logic 123 and reuses some of the outputs of the filters used to implement the function of the decomposition logic 123. In other examples, the LL2 logic 124 may be a separate hardware or software unit and the function of each of the filters is performed by a separate set of filters or by the image processor 95.

Passing the pre-processed FBS pixel data through the LL2 logic 124 provides the local intensity level captured by the pixel sensor that corresponds to the pre-processed FBS pixel data. The LL2 logic 124 is configured to generate the local image intensity for different frequency bands (e.g., high passband, mid passband, and low passband) for the 4 color planes of the 2×2 CFA. The output of the LL2 logic 124 is represented herein as local_image_intensity [3] [4], where 3 refers to the frequency bands and 4 refers to the color filters in the 2×2 CFA. The outputs of both decomposition and LL2 logic 123, 124, respectively, are received by the threshold logic 125. The threshold logic 125, in addition to calculating a noise threshold value, estimates a noise value in the incoming FBS pixel data. The threshold logic 125 is described in detail with respect to FIG. 4. The output of the threshold logic 125, e.g., the noise value, is reconstructed in the reconstruction logic 126. The reconstruction logic 126 reconstructs the captured image using the output of the threshold logic 125, and output post processing logic 127 further processes the reconstructed image.

Figure 4:
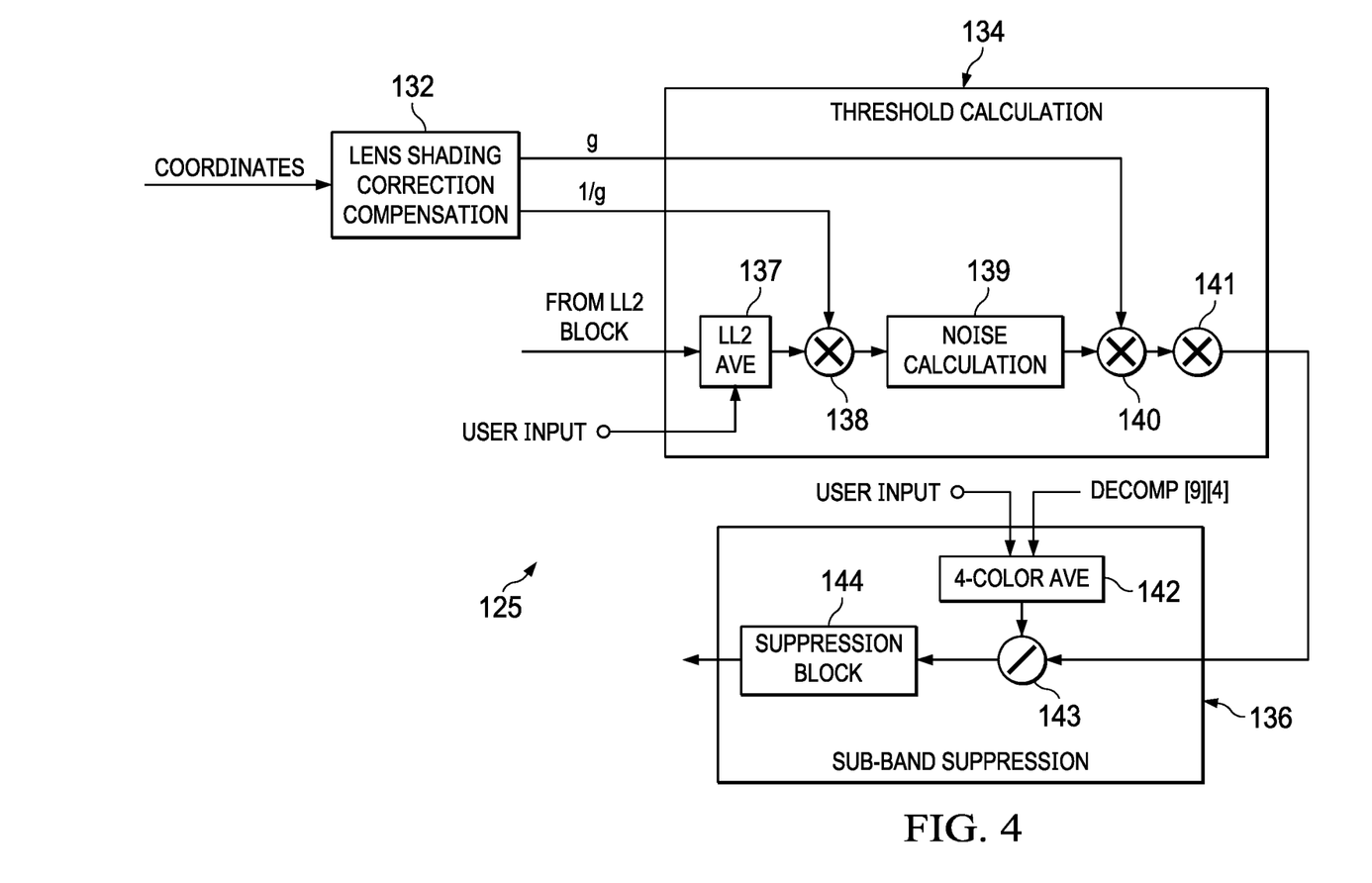
FIG. 4 depicts a simplified diagram of a threshold logic of the noise filter logic, in accordance with various examples.

Referring now to FIG. 4, a simplified diagram of the threshold logic 125 is depicted. The threshold logic 125, in some examples, receives the output of the decomposition logic 123 and the LL2 logic 124. In some examples, the threshold logic 125 includes a lens shading correction compensation logic 132, a threshold calculation logic 134, and a sub-band suppression logic 136. Each of these logic blocks is explained in detail below.

First the lens shading correction compensation logic 132 is described. The need for lens shading correction can be attributed to the geometric pattern of the pixel sensor array disposed in the image capture device 91 (FIG. 1), in that the raw pixel data captured by the pixel sensors positioned towards the edge of the image capture device 91 may be distorted. In some examples, lens shading correction is performed on the raw pixel data before the data is received by the front-end processing logic 110 (FIG. 2), while, in other examples, the lens shading correction may be performed by the front-end processing logic 110 after receiving the raw pixel data. Therefore, to perform noise filtering on the correct values of raw pixel data, the threshold logic 125 includes the lens shading correction compensation logic 132, which compensates for the lens shading correction that has already been performed.

Figure 5:
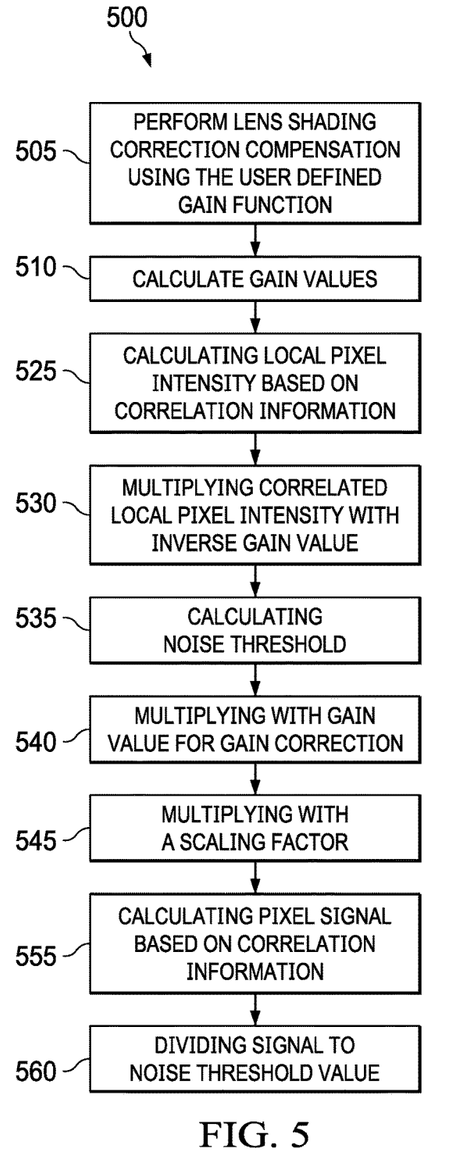
FIG. 5 depicts an illustrative method performed by the noise filter, in accordance with various examples.

The operation of the lens shading correction compensation logic 132 is now described in tandem with FIG. 5 and FIG. 1. FIG. 5 depicts an illustrative method 500 that may be performed by the noise filter logic 120. Steps 505-510 of the method 500, in one example, are performed by the lens shading correction compensation logic 132. The step 505 includes performing lens shading correction compensation using a user-programmed (or defined) function. For example, a user, such as a car manufacturer, may program the lens shading correction compensation gain function based on some characteristics (e.g., the type of lens used) of the image capture device. In one example, the user-programmed function performing lens shading correction compensation may be a look-up table including a radius value and a gain value. The radius value is calculated from an optical center of the image capture device 91 (FIG. 1), which is the center of the N×K array of pixel sensors present in the image capture device 91. Since the optical center depends on the image capture device 91, the value of the optical center may also be user programmable and stored in the memory 94.

Table 1 depicts one such look-up table. In some examples, the user-programmed function is implemented using a mathematical function, such as a piecewise linear function. Briefly referring now to Table 1 and the step 505, since the gain depends on the distance of a pixel sensor from the optical center, the coordinates (or matrix indexes: n,k) of the pixel sensors may be supplied to the lens shading correction compensation logic 132 by the image processor 95. For each incoming set of coordinates, the radial distance between the center of the pixel sensor and the optical center is calculated by the lens shading correction compensation logic 132, and a respective gain value (step 510), based on the look-up Table 1, is calculated for the subsequent steps.

TABLE 1

| Radius | Gain |
|---|---|
| 0 | 1.0 |
| 600 | 2.0 |
| 1200 | 3.0 |
| 1800 | 4.0 |
| 2400 | 5.0 |

Figure 7:
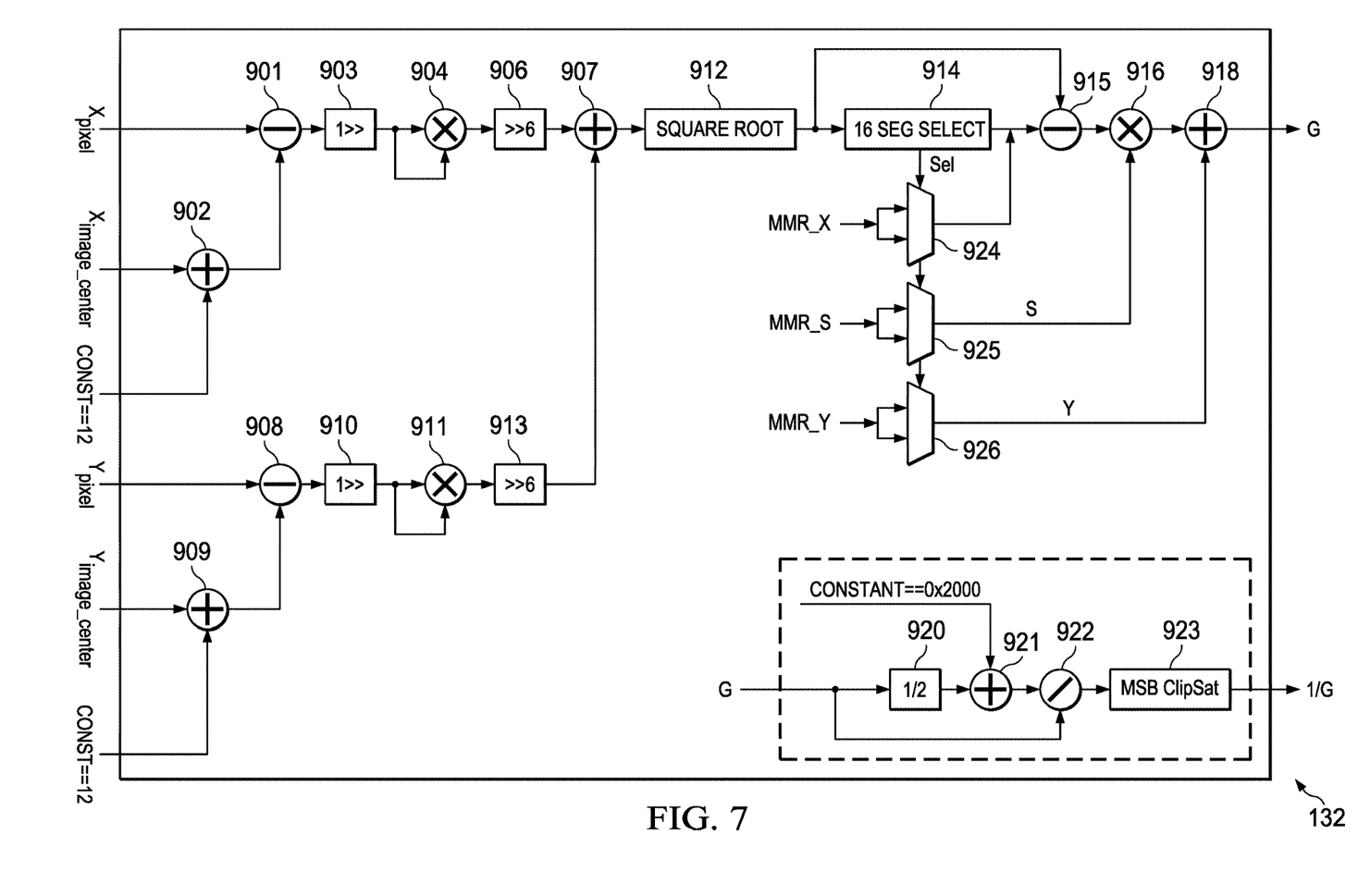
FIG. 7 depicts an illustrative hardware implementation of the lens shading correction compensation logic, in accordance with various examples.

Another implementation of the lens shading correction compensation logic 132 is shown in FIG. 7. To provide a gain value for different pixel locations, the logic 132 first calculates the spatial location of the pixel relative to the optical center of the image frame. For the sake of illustration, assume that the optical center has the coordinates ($X_{image\_center}$, $Y_{image\_center}$) and the current/instant input pixel has the coordinates ($x_{pixel}$, $y_{pixel}$). The coordinates $X_{image\_center}$ and $Y_{image\_center}$ are user configurable and may depend on the type of lens used in the image capture device 91 (FIG. 1). The coordinates of the optical center may be stored in a register by the user. The radial distance, or radius, may be calculated by implementing equation 1 (see below) using one or more digital logic components/devices:

$$\text{Radius} = \sqrt{(x_{pixel} - X_{image_{center}})^2 + (y_{pixel} - Y_{image_{center}})^2} \quad (1)$$

To implement equation 1, digital logic including one or more digital logic gates/devices are coupled together in such a manner that the resulting digital logic performs mathematical functions, such as addition, subtraction, multiplication, and division. In one example, the first portion of equation 1, $(x_{pixel} - X_{image_{center}})^2$, may be implemented by using a subtraction logic 901 and a multiplication logic 904. The input $x_{pixel}$ is first subtracted from the x coordinate of the optical center $X_{image\_center}$. The resulting difference is then twice multiplied in the multiplication logic 904 to implement the first portion of equation 1. In some examples, the $X_{image\_center}$ coordinate is added with a constant number, which in this example is 12, to align with a filter kernel used in the subsequent steps. The filter kernel comprises a convolution matrix that is multiplied with the pixel data of an image to produce a filtered image. For example, the filter kernel may be used to blur, sharpen, or emboss the image.

Similarly, the second portion of equation 1, $(y_{pixel} - Y_{image_{center}})^2$, may be implemented by using a subtraction logic 908 and a multiplication logic 911. The inputs $y_{pixel}$ and $Y_{image\_center}$ are first subtracted in the subtraction logic 908, and the resulting difference is multiplied twice in the multiplication logic 911. In some examples, a constant number, e.g., 12, may be added to the $Y_{image\_center}$ coordinate to align with the filter kernel. The implementation shown in FIG. 7 may also include bit clipping logic that is configured to saturate or round the binary bits of the data stream for approximation purposes. For example, logic 903 and 910 saturate the most significant bits from the data stream and the logic 906 and 913 round the fractional decimal places (or the least significant bits). Saturating and rounding involve removing the most significant bits and the least significant bits, respectively, from a data stream. The term "clip" or "clipping" may also be used to denote saturation or rounding, depending on whether the most significant bits or least significant bits are in question.

Further, the outputs of both the first and second portions are added by using an addition logic 907. The output of the addition logic circuit 907 is then provided to a square root logic 912 to find the square root of the output of the logic circuit 907. The square root logic 912, in one example, includes digital logic that performs binary shift operations and a recursive algorithm to find the square root, which computes the radial distance of the instant pixel relative to the image center. This radial distance (or radius) may then be provided to approximation logic 914, which, in one example, is a 16-segment select logic. In one example, the 16-segment select logic is performed by a 16-segment interpolated piece-wise linear lookup function. As is described below, the approximation logic 914 involves accessing data stored in user-programmable memory registers. This data can be programmed by a user based on, for example, the type of CFA used in the image capture device to accommodate for the linearity and non-linearity of different types of arrays. Thus, the approximation logic 914 can be referred to as being user-programmable.

Figure 8:
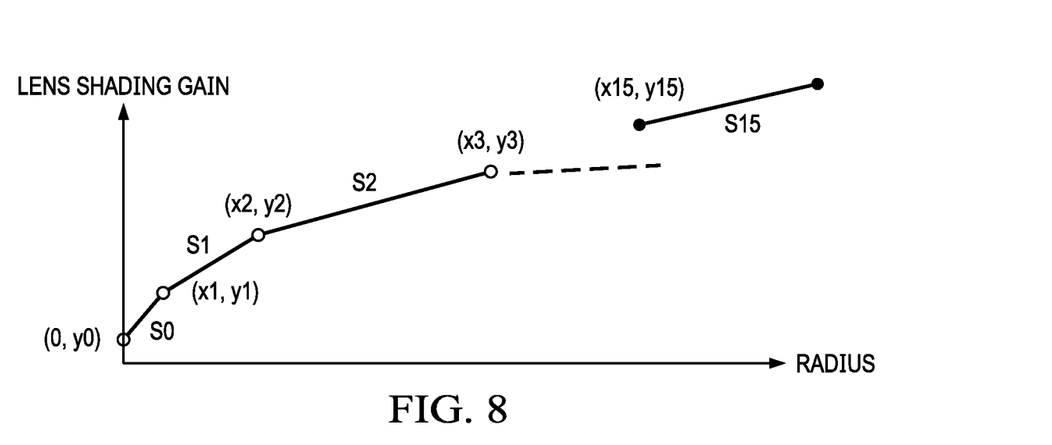
FIG. 8 depicts an illustrative 16-segment piece-wise linear lookup function, in accordance with various examples.

An example 16-segment piece-wise linear lookup function is shown in FIG. 8. The X-axis of the 16-segment piece-wise linear lookup function is the radial distance generated by the logic 912 and the Y-axis of the 16-segment piece-wise linear lookup function is the lens shading gain. FIG. 8 depicts 16 sets of $X_k$, $Y_k$, and $S_k$, where $X_k$, $Y_k$ coordinates are the initial coordinates of a segment/slope $S_k$. The first X coordinate of the slope $S_0$ is fixed at zero. For each pixel (or, for each radius value generated by the logic 912), the approximation logic 914 selects X, Y, S values by sending a control signal to multiplexers 924, 925, and 926. For example, if a radius value lies between X2 and X3, the approximation logic 914 sends a control signal to multiplexers 924, 925, and 926 to select X2, S2 and Y2, respectively, from their respective memory locations MMR_X, MMR_S, and MMR_Y.

After selecting the X, Y, and S values, the logic 132 subtracts X2 from the radius using the subtraction logic circuit 915, and then multiplies the difference with the slope of the segment S2 using the multiplication logic circuit 916. The output of the circuit 916 is then added, at the addition digital circuit 918, to the selected Y coordinate, which provides the gain value G corresponding to the instant pixel coordinates. In some examples, the output of the circuit 918 is approximated before the gain value is communicated to the subsequent logic. An inverse of the gain value G is also computed by the lens shading correction compensation logic 132. In one implementation, the inverse can be computed by first dividing the gain value G by 2. This division function may be performed by logic 920 by right shifting the binary equivalent of the gain value G. The output of the logic 920 may then be added (using addition digital circuit 921) to a constant value stored at a predefined register location (e.g., 0X2000). The output of the logic 921 is divided by the gain value using the division digital circuit 922. The most significant bits of the output of the circuit 922 are clipped to generate the inverse of the gain value G. The 16-segment interpolated piece-wise linear lookup function can be programmed by a user. For example, the values of X, Y, and slope of the different segments may be stored by the user. The values of X, Y, and slope may be adapted based on the type of color filter array employed in the image capture device to accommodate for the linearity and non-linearity of different types of arrays.

The mathematical digital logic (e.g., addition, subtraction, multiplication, division) used in the example hardware implementation of the lens shading correction compensation logic 132 include one or more array of logic gates (e.g., NOR, NAND) connected to each other in such a manner so as to generate the desired mathematical output.

Referring back to FIG. 4, now the threshold calculation logic 134 is described. The threshold calculation logic 134 is configured to calculate a noise threshold value given the local intensity (e.g., LL2 [3] [4]) and the gain value obtained by the lens shading correction compensation logic 132. In some examples, the threshold calculation logic 134 includes a cross-color-channel local image intensity estimation logic 137 (or LL2 averaging logic 137), multiplication logic 138, 140, and 141, and a noise calculation logic 139.

The operation of the threshold calculation logic 134 is now described in tandem with steps 525-545 of the method 500 shown in FIG. 5. The LL2 averaging logic 137 receives LL2 [3] [4] from the LL2 logic 124, and calculates the local pixel intensity based on the correlation information supplied by a user (step 525). For example, the user, such as a car manufacturer, may provide pixel sensor correlation information. The correlation information may include information regarding the CFA used in the image capture device 91 (FIG. 1). If a CFA pattern of red, blue, green, and IR filters is used, then the raw pixel data captured by the red, blue, and green pixel sensor will be correlated. The user may program this correlation information into the registers in the memory 94 such that the image processor 95 correlates (i.e., applies a weight to) the average intensity data produced by the LL2 logic 124 to generate correlated average intensity data ("LL2 average data" hereinafter), and the un-correlated local intensity is used in subsequent steps as is. In some examples, the stored correlation information may be in the form of averaging weights of LL2 [3] [4] for each output color. The stored/programmed correlation information used by the IPS 90 processes the information efficiently and generates a higher-resolution image.

After the step 525, the LL2 average data is multiplied by an inverse of the gain value calculated for the corresponding pixel sensor by the lens shading correction compensation logic 132 (step 530; multiplication logic 138). The inverse of the gain value is multiplied to compensate for the already performed lens shading correction. The gain-corrected LL2 average data is provided to the noise calculation logic 139, which uses the LL2 average data to calculate the noise value for the corresponding pixel sensor location (step 535; noise calculation logic 139). The noise calculation logic 139 utilizes a noise-intensity function stored in the memory 94, e.g., as a look-up table, to calculate the noise. In some examples, the noise-intensity function includes one look-up table for each color.

In some examples, the noise-intensity function may be a square root function of noise and intensity. In such an example, the intensity value may be on the x-axis (independent variable), and the noise value may be on the y-axis (dependent variable). In some examples, the noise-intensity function may be user-programmable. For example, a user, such as a car manufacturer, may program the noise-intensity function in memory 94 (FIG. 1).

After calculating the noise threshold in the noise calculation logic 139, the noise threshold value of the pixel sensor is provided to the multiplication logic 140 where the noise threshold value is multiplied with the lens shading correction gain calculated by the lens shading correction compensation logic 132 (logic 540; multiplication logic 140). This gain value is multiplied to correct the lens shading compensation that was done in the multiplication logic 138. In some examples, after the gain correction logic 540, the gain corrected noise threshold value is multiplied again with a user programmable scaling factor to calculate gain corrected noise threshold value for each band (step 545; multiplication logic 141).

A more detailed implementation of the threshold calculation logic 134 is now described with respect to FIG. 9. Refer to the LL2 averaging logic 137, which, as noted above, is configured to calculate the local pixel intensity based on the user-programmed correlation information of the color filter arrays. The local pixel intensities received from the correlated filters are summed and averaged together, and the local pixel intensity received from the uncorrelated channels is passed through the subsequent steps without averaging with the local pixel intensity of the correlated channels.

The correlation information may be stored as an array of binary bits in user-programmable memory registers present, in one example, in LL2 sum logic 1001. In other examples, the correlation information may be stored in programmable memory registers accessible by the LL2 sum logic 1001. Each bit represents a filter in a recurring unit of a CFA, and the bit value indicates whether the filter can be correlated with the other filters in the recurring unit. For example, if a Bayer CFA (R, G, G, B) is employed, the user may store 1, 1, 1, 1 in the memory. In this example, the first bit value 1 corresponds to R, the second bit value 1 corresponds to G, the third bit value 1 corresponds to G, and the fourth bit value 1 corresponds to B. Since all bit values are 1, the stored correlation information indicates that the information received from each filter in the Bayer CFA is correlated.

However, if an arbitrary CFA with, for example, an R, G, IR, C recurring pattern is employed, the user may store 1, 1, 0, 0 in the memory. In this example, the first bit value 1 corresponds to R, the second bit value 1 corresponds to G, the third bit value 0 corresponds to IR, and the fourth bit value 0 corresponds to C. This example indicates that the information received from the channels corresponding to R and G are correlated, and the information received from the channels corresponding to IR and C are uncorrelated. Since a user would have the CFA information available to them prior to using the image processing system, the user can program the correlation information based on the type of CFA employed in the system to improve adaptability of the image processing system.

In one example, the LL2 averaging logic 137 includes LL2 sum logic 1001, a multiplication logic 1002, and logic 1003 that round/clip the fractional decimal places (or the least significant bits) and logic 1004 that clip/saturate the most significant bits from their respective input data streams. The LL2 sum logic 1001 is configured to receive the output from the LL2 logic 124 and add the data from the correlated channels. The LL2 sum logic 1001 also selects, by sending a control signal to multiplexer 1005, a constant integer value const[7:0], which is then multiplied with the output of the LL2 sum logic 1001 at the multiplication logic 1002. The constant integer value is an averaging constant and is selected based on the number of channels to average. After rounding and clipping at logic 1003, 1004, respectively, the output (LL2 average data) of the LL2 averaging logic 137 is multiplied, at the multiplication logic 138, by the inverse gain value of the respective pixel location. The product of this multiplication logic 138 may then be rounded and clipped at logic 1006 and 1007, respectively, to generate gain corrected LL2 average data.

The threshold calculation logic 134 shown in FIG. 9 further depicts a more detailed implementation of the noise calculation logic 139. The noise calculation logic 139, as noted above, implements a noise-intensity function. In one example, the noise-intensity function is implemented using approximation logic 1008. As is described below, the approximation logic 1008 involves accessing data stored in user-programmable memory registers. This data can be programmed by a user based on, for example, the type of CFA used in the image capture device to accommodate for the linearity and non-linearity of different types of arrays. Thus, the approximation logic 914 can be referred to as being user-programmable.

Figure 10:
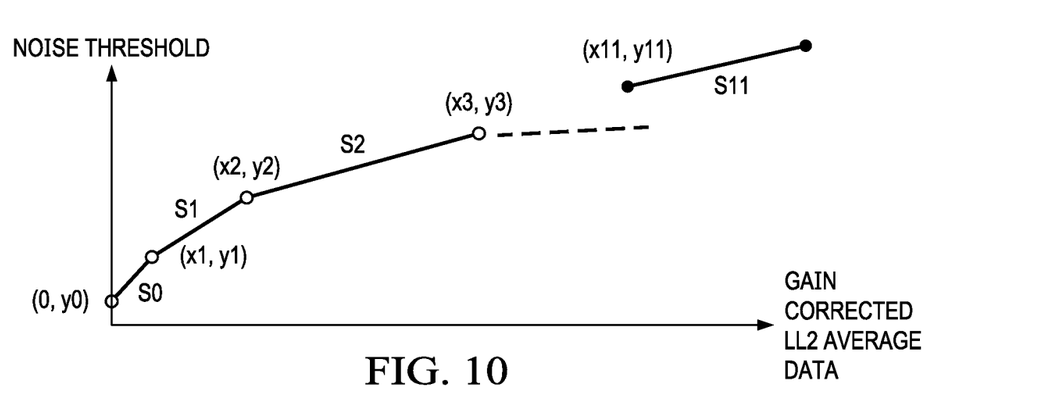
FIG. 10 depicts an illustrative 12-segment piece-wise linear lookup function, in accordance with various examples.

The approximation logic 1008 performs average-to-threshold mapping via a 12-segment interpolated piece-wise linear lookup function. FIG. 10 depicts an example of such a 12-segment piece-wise linear lookup function. The X-axis and Y-axis of the 12-segment piece-wise linear lookup function are gain corrected LL2 average data and noise threshold, respectively. FIG. 10 depicts 12 sets of $X_m$, $Y_m$, and $S_m$, where $X_m$, $Y_m$ coordinates are the initial coordinates of a segment/slope $S_m$. The first X coordinate of the slope $S_0$ is fixed at zero. For every gain corrected LL2 average data, the approximation logic 1008 selects X, Y, S values by sending a control signal to multiplexers 1017, 1018, and 1019. For example, if the instant gain corrected LL2 average data lies within X2 and X3, the approximation logic 1008 sends a control signal to multiplexers 1017, 1018, and 1019 to select X2, S2 and Y2, respectively from their respective memory locations MMR_$X_m$, MMR_$S_m$, and MMR_$Y_m$.

After computing the noise threshold in the noise calculation logic 139, the noise threshold value of the pixel sensor is provided to the multiplication logic 140 where the noise threshold value is multiplied with the lens shading correction gain calculated by the lens shading correction compensation logic 132 to correct the lens shading compensation that was done in the multiplication logic 138. The output of the multiplication logic 140 may be rounded and clipped at logic 1013 and 1014, respectively. In some examples, the gain corrected noise threshold value is multiplied, by a multiplication logic 141, with a user programmable scaling factor (MMR_TnScale) to calculate a gain corrected noise threshold value for each band. The output of the multiplication logic 141 may also be rounded and clipped at logic 1015 and 1016, respectively, to generate the threshold value for each band.

Referring back to FIG. 4, the sub-band suppression logic 136 is now described. The sub-band suppression logic 136, in some examples, includes a cross-color-channel local band signal estimation logic 142 (or 4-color averaging logic 142), division logic 143, and suppression logic 144. The sub-band suppression logic 136 is configured to calculate an estimated noise value for a given decomposed signal DECOMP [J] [4]. The estimated noise value for each pixel location is then utilized in later stages to generate a noise map of the image, which is then subtracted from the original image to reconstruct an output image.

The operation of the sub-band suppression logic 136 is now described in tandem with steps 555-560 of method 500 shown in FIG. 5. The 4-color averaging logic 142 receives the decomposed signal DECOMP [J] [4], and calculates the average of the decomposed signal [J] [4] based on the correlation information supplied by a user in step 525 (step 555). The average of the decomposed signal [J] [4] is also sometimes herein referred to as local signal data and is a measure of activity in the decomposed signal [J] [4]. Similar to the correlated local intensity calculated in the LL2 averaging logic 137, 4-color averaging logic 142 averages the correlated local signal data. The user may program this correlation information into the registers in the memory 94 such that the image processor 95 averages the signal data received by the red, blue, and green pixel sensor to generate the correlated signal average and the un-correlated pixel sensor data is provided to the subsequent steps as is. In some examples, the stored correlation information may be in the form of averaging weights of DECOMP [J] [4] for each output color.

Following the step 555, the method 500 proceeds to the step 560 that includes dividing the local signal data produced in the step 555 by the noise threshold value produced in the threshold calculation logic 134 in the division logic 143. The output of this division logic, in some examples, is provided to the suppression logic 144, which implements soft thresholding for texture retention and fine grain noise retention. The suppression logic 144 implements its function by preserving signals over the noise threshold value (calculated in the threshold calculation logic 134) and suppressing signals below a ratio (e.g., ⅓) of the noise threshold value.

Figure 11A:
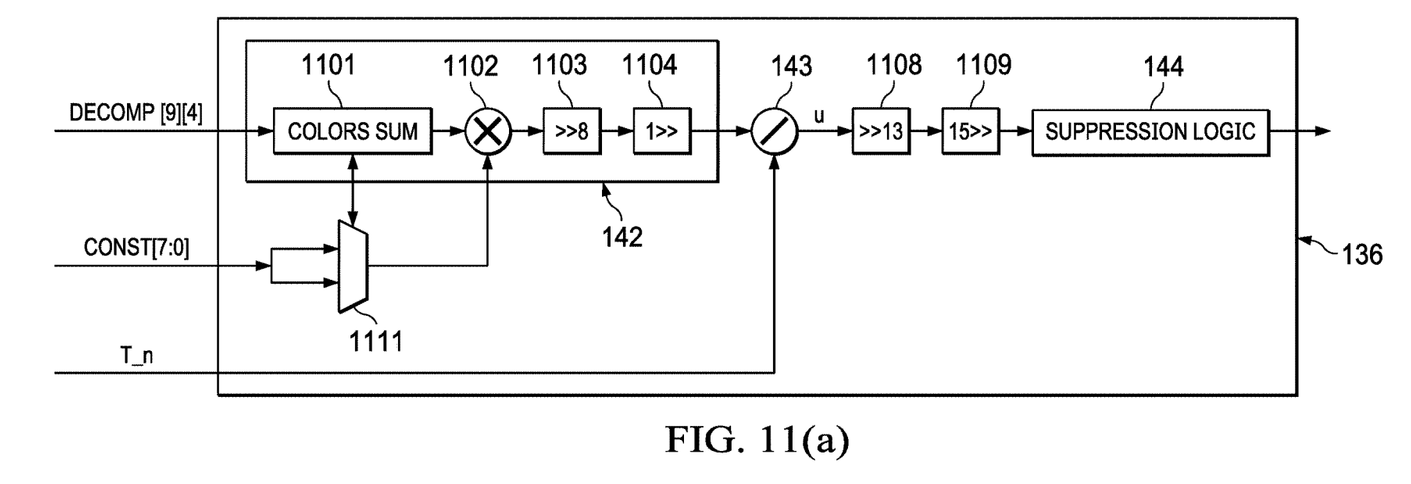
FIG. 11(a) depicts an illustrative hardware implementation of a sub-band suppression logic present in the threshold logic of FIG. 4, in accordance with various examples.

A more detailed implementation of the sub-band suppression logic 136 is now described with respect to FIG. 11(a). Refer to the 4-color averaging logic 142, which, as noted above, is configured to calculate the local signal data based on the user-programmed correlation information of the color filter arrays. The local signal data received from the correlated filters are summed and averaged together, and the local signal data received from the uncorrelated channels are passed through unchanged to the subsequent logic. The correlation information may be stored as an array of binary bits in user-programmable memory registers present, in one example, in color sum logic 1101. In other examples, the correlation information may be stored in programmable memory registers accessible by the color sum logic 1101. In other examples, the correlation information may be shared, via one or more programmable registers, between the LL2 sum logic 1001 and color sum logic 1101.

In one example, the 4-color averaging logic 142 includes color sum logic 1101, a multiplication logic 1102, and logic 1103 that round/clip the fractional decimal places (or the least significant bits) and logic 1104 that clip/saturate the most significant bits from their respective input data streams.

Figure 11B:
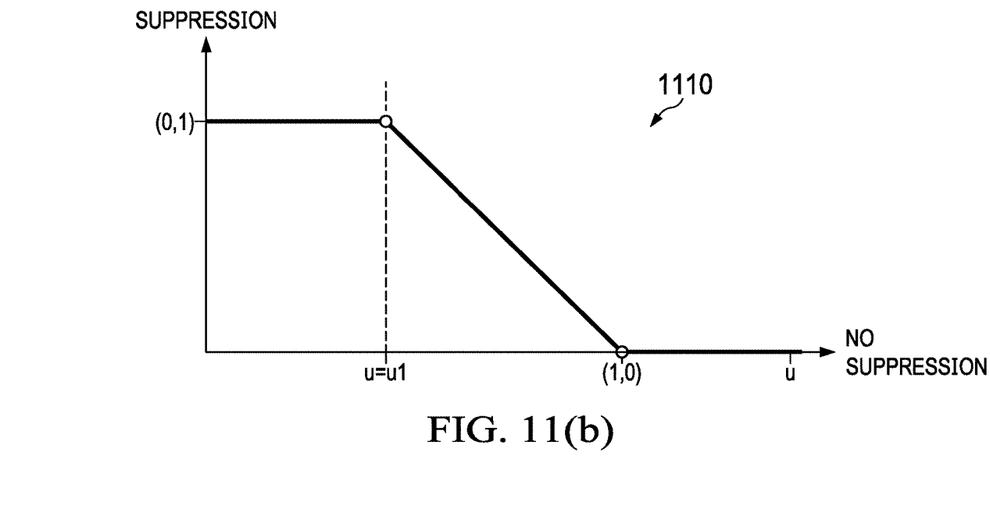
FIG. 11(b) depicts an illustrative suppression piece-wise linear function, in accordance with various examples.

The color sum logic 1101 is configured to receive the decomposed signal DECOMP [J] [4] and add the decomposed signal that corresponds to the correlated channels. The output of the color sum logic 1101 is then multiplied, at the multiplication logic 1102, with a constant integer value const [7:0], stored in 8 bits. After rounding and clipping at logic 1103, 1104, respectively, the averaged decomposed signal [J] [4] is then divided, at the division logic 143, by the threshold value attained in the threshold calculation logic 134 to generate a signal to noise ratio value (u) at the instant pixel location. The signal to noise ratio value may then be rounded and clipped at logic 1108 and 1109, respectively. This signal to noise ratio value is then provided to the suppression logic 144 that is configured to estimate a noise value for each of the pixels by implementing a suppression piece-wise linear function 1110 shown in FIG. 11(b). The X-axis of the suppression piece-wise linear function 1110 represents the signal to noise ratio value (u), and the Y-axis represents the suppression value of the signal. The function includes a common knee point u1, which, in some examples, can be defined by the user. The knee point U1 acts as a reference or threshold point for the signal to noise ratio value such that at u=u1, the suppression is equal to 1, meaning the noise is high and the signal needs to be suppressed; at u=1 and above, the suppression is equal to zero, meaning the noise is low and the signal need not be suppressed; and between u1 and 1, the suppression value is linearly interpolated. Stated another way, the function of the suppression logic 144 is intended to implement soft thresholding. Signals far above the noise threshold value should be preserved (suppression=0). Signals below a defined level (u=u1) of the noise threshold should be suppressed completely, and in between in the transition zone, suppression is scaled linearly. This creates a noise map of the image which quantifies an estimated noise, and this estimated noise is then subtracted from the original image to reconstruct an output image in the subsequent logic.

Figure 6:
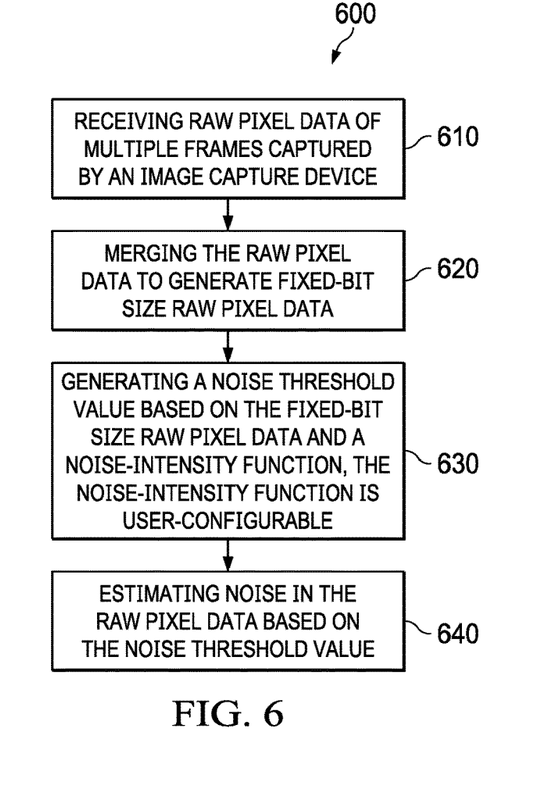
FIG. 6 depicts an illustrative method performed by the image processing system, in accordance with various examples.

Referring now to FIG. 6, an illustrative method 600 performed by the image processing system 90 of FIG. 1 is shown. The method 600 includes receiving raw pixel data of multiple frames captured by the image capture device 91 (step 610); merging the raw pixel data to generate fixed-bit size raw pixel data (step 620); generating a noise threshold value based on the fixed-bit size raw pixel data and a noise-intensity function, the noise-intensity function being user-configurable (step 630); and estimating noise in the raw pixel data based on the noise threshold value (step 640).

In the foregoing discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. Similarly, a device that is coupled between a first component or location and a second component or location may be through a direct connection or through an indirect connection via other devices and connections. An element or feature that is "configured to" perform a task or function may be configured (e.g., programmed or structurally designed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Additionally, uses of the phrases "ground" or similar in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about," "approximately," or "substantially" preceding a value means +/−10 percent of the stated value.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A system comprising:
an image capture device configured to provide image data that includes a set of channels;
a memory configured to store correlation information that specifies a noise correlation value for each channel of the set of channels; and
an image processor coupled to the image capture device and the memory and configured to:
receive the image data;
based on the image data, determine a respective local intensity for each channel of the set of channels;
sum the respective local intensities of a subset of the set of channels based on the correlation information to produce a sum of local intensities;
determine a noise threshold based on the sum of local intensities;
perform wavelet decomposition on the image data to produce respective decomposed image data for each channel of the set of channels;
sum the respective decomposed image data of the subset of the set of channels based on the correlation information to produce an intermediate sum; and
apply a noise suppression function to each channel of the subset of the set of channels based on the noise threshold, wherein the noise suppression function is based on the intermediate sum.

2. The system of claim 1, wherein:
the image capture device includes a color filter;
each channel of the set of channels of the image data is associated with a respective color of the color filter; and
the correlation information is associated with the color filter.

3. The system of claim 1, wherein:
the memory is further configured to store a noise-intensity function; and
the image processor is configured to determine the noise threshold further based on the noise-intensity function.

4. The system of claim 1, wherein, to determine the noise threshold, the image processor is further configured to:
apply an averaging value that is based on a number of channels in the subset of the set of channels to the sum of local intensities to produce an intermediate intensity value; and
apply a noise-intensity function to the intermediate intensity value.

5. The system of claim 1, wherein the image processor is configured to:
determine a gain value associated with the image capture device; and
apply an inverse of the gain value to the sum of local intensities prior to the determining of the noise threshold.

6. The system of claim 5, wherein the gain value is a lens shading correction compensation gain value.

7. The system of claim 1, wherein:
the image data is associated with a set of images;
the image processor is further configured to merge the image data across images of the set of images to produce high dynamic range image data; and
the respective local intensity for each channel of the set of channels is based on the high dynamic range image data.

8. A system comprising:
an image capture device configured to provide image data that includes a set of channels including a first channel;
a memory configured to store correlation information that specifies a noise correlation value for each channel of the set of channels; and
an image processor coupled to the image capture device and the memory and configured to:
receive the image data;
based on the image data, determine a respective local intensity for each channel of the set of channels;
sum the respective local intensities of a subset of the set of channels based on the correlation information to produce a sum of local intensities, wherein the subset of the set of channels does not include the first channel;
determine a first noise threshold based on the sum of local intensities;
apply a noise suppression function to each channel of the subset of the set of channels based on the first noise threshold;
determine a local intensity of the first channel;
determine a second noise threshold based on the local intensity of the first channel that is independent of a remainder of the set of channels; and
apply the noise suppression function to the first channel based on the second noise threshold.

9. A method comprising:
receiving image data that includes a set of channels;
determining a respective local intensity for each channel of the set of channels;
receiving correlation information associated with the set of channels;
determining a subset of the set of channels to sum based on the correlation information;
summing the respective local intensities of the subset of the set of channels to produce a sum of local intensities;
determining a noise threshold based on the sum of local intensities
producing respective decomposed image data for each channel of the set of channels;
summing the respective decomposed image data of the subset of the set of channels based on the correlation information to produce an intermediate sum; and
applying a noise suppression function to each channel of the subset of the set of channels based on the noise threshold, wherein the noise suppression function is based on the intermediate sum.

10. The method of claim 9, wherein:
the image data is associated with a color filter; and
the correlation information is associated with the color filter.

11. The method of claim 9, wherein the producing of the respective decomposed image data for each channel of the set of channels includes:
performing wavelet decomposition on the image data to produce the respective decomposed image data for each channel of the set of channels.

12. The method of claim 9 further comprising:
determining a lens shading correction gain value; and
applying an inverse of the lens shading correction gain value to the sum of local intensities prior to the determining of the noise threshold.

13. The method of claim 9, wherein:
the image data is associated with a set of images;
the method further comprises merging the image data across images of the set of images to produce high dynamic range image data; and
the respective local intensity for each channel of the set of channels is based on the high dynamic range image data.

14. The method of claim 9, wherein the determining of the noise threshold includes applying an averaging value that is based on a number of channels in the subset of the set of channels to the sum of local intensities to produce an intermediate intensity value, wherein the noise threshold is based on the intermediate intensity value.

15. A method comprising:
receiving image data that includes a set of channels that includes a first channel;
determining a respective local intensity for each channel of the set of channels;
receiving correlation information associated with the set of channels;
determining a subset of the set of channels to sum based on the correlation information, wherein the subset of the set of channels does not include the first channel;
summing the respective local intensities of the subset of the set of channels to produce a sum of local intensities;
determining a first noise threshold based on the sum of local intensities; and
applying a noise suppression function to each channel of the subset of the set of channels based on the first noise threshold;
wherein the method further comprises:
determining a local intensity of the first channel;
determining a second noise threshold based on the local intensity of the first channel that is independent of a remainder of the set of channels; and
applying the noise suppression function to the first channel based on the second noise threshold.

16. A device comprising:
an image processor; and
a non-transitory computer-readable memory coupled to the image processor that stores instructions that, when executed, cause the image processor to:
receive image data that includes a set of channels;
receive correlation information for the set of channels, the correlation information indicating a subset of channels having correlated image data;
determine a respective local intensity for each channel of the set of channels;
sum the respective local intensities of the subset of channels to produce a sum of local intensities;
determine a noise threshold based on the sum of local intensities;
perform wavelet decomposition on the image data to produce respective decomposed image data for each channel of the set of channels;
sum the respective decomposed image data of the subset of the set of channels based on the correlation information to produce an intermediate sum;
determine a noise suppression function based on the intermediate sum; and
apply the noise suppression function to each channel of the subset of the set of channels based on the noise threshold.

17. The device of claim 16, wherein:
the set of channels is associated with a color filter; and
the correlation information is associated with the color filter.

18. The device of claim 16, wherein:
the image data is associated with a set of images;
the instructions further cause the image processor to merge the image data across images of the set of images to produce high dynamic range image data; and
the respective local intensity for each channel of the set of channels is based on the high dynamic range image data.

* * * * *